(12) United States Patent
Hoffmann et al.

(10) Patent No.: US 7,620,365 B2
(45) Date of Patent: Nov. 17, 2009

(54) INTERNET BASED DIGITAL SATELLITE RADIO SYSTEM AND ASSOCIATED METHODS FOR PROVIDING INDOOR RECEPTION

(75) Inventors: John E. Hoffmann, Indialantic, FL (US); Thomas E. Gorsuch, Merritt Island, FL (US)

(73) Assignee: InterDigital Technology Corporation, Wilmington, DE (US)

( * ) Notice: Subject to any disclaimer, the term of this patent is extended or adjusted under 35 U.S.C. 154(b) by 413 days.

(21) Appl. No.: 11/215,148

(22) Filed: Aug. 30, 2005

(65) Prior Publication Data

US 2007/0047475 A1 Mar. 1, 2007

(51) Int. Cl.
*H04B 7/185* (2006.01)
(52) U.S. Cl. .............. 455/12.1; 455/11.1; 455/13.1; 370/315; 370/316
(58) Field of Classification Search ............ 455/3.02, 455/3.05, 427, 12.1, 3.01, 11.1, 13.1; 370/315, 370/316
See application file for complete search history.

(56) References Cited

U.S. PATENT DOCUMENTS

| | | | |
|---|---|---|---|
| 7,274,906 B1 * | 9/2007 | Nguyen et al. ............ | 455/3.05 |
| 2004/0172647 A1 * | 9/2004 | Godwin ..................... | 725/36 |
| 2004/0912189 * | 9/2004 | Yuhara et al. ............. | 455/3.02 |
| 2006/0105702 A1 * | 5/2006 | Muth et al. ................ | 455/2.01 |
| 2006/0133465 A1 * | 6/2006 | Dockemeyer et al. ...... | 375/211 |
| 2007/0021053 A1 * | 1/2007 | Marrah ...................... | 455/3.02 |

* cited by examiner

*Primary Examiner*—Vincent P Harper
*Assistant Examiner*—Khai M Nguyen
(74) *Attorney, Agent, or Firm*—Allen, Dyer, Doppelt, Milbrath & Gilchrist, P.A

(57) ABSTRACT

A digital satellite radio system includes a content server for providing digital satellite radio channels, a satellite for broadcasting the digital satellite radio channels, and a terrestrial repeater for broadcasting the digital satellite radio channels. A micro-repeater receives a selected digital satellite radio channel from the content server via the Internet while not receiving unselected digital satellite radio channels, and wirelessly broadcasts the selected digital satellite radio channel in a different waveform as used by the terrestrial repeater but using a same physical layer. A digital satellite radio unit receives the selected digital satellite radio channel from the micro-repeater while not receiving the unselected digital satellite radio channels.

24 Claims, 5 Drawing Sheets

INTERNET BASED DIGITAL SATELLITE RADIO SYSTEM AND ASSOCIATED METHODS FOR PROVIDING INDOOR RECEPTION

FIELD OF THE INVENTION

The present invention relates to the field of communications, and more particularly, to digital satellite radio systems.

BACKGROUND OF THE INVENTION

Many of the satellite radio transmissions by XM Radio and Sirius fail to have enough link margins for continued operations within buildings. Large metropolitan urban areas have been deployed with terrestrial repeaters to address indoor coverage problems. Unfortunately, there is no adequate approach to indoor coverage problems in rural and non-metropolitan areas.

Signals are transmitted by the satellites using a left-hand circular polarization. The antennas that receive these signals are typically designed to exploit this polarization. The first multipath reflection of a satellite signal is normally converted to right-hand circular polarization, and therefore, is not well received by the antennas. As a result, both signal strength and polarization are fighting for indoor penetration within buildings.

Current indoor reception approaches focus on directing satellite or terrestrial signals into the buildings using a repeater or sub-repeater. Two products offered by XM Radio or their affiliates address indoor coverage problems, but fall short of expectations. The first product is the Delphi Roady 2, which has a built in FM modulator to send the selected radio channel to a legacy FM radio receiver. The problem with an FM modulator is that they do not deliver adequate fidelity. The second product is the XM PCR, which receives the radio channels from the satellite or a terrestrial repeater. The XM PCR presents analog audio to the line-in of a PC audio card, and a digital data stream using a USB connection.

Currently, home or business micro-repeaters are installed in a southern window for satellite reception. Micro-repeaters need to be both a satellite receiver and a terrestrial transmitter. In these cases, they are just as complicated as a land based terrestrial macro-repeater. The micro-repeaters and macro-repeaters require a relatively large bandwidth since they relay the entire digital satellite radio channels, i.e., 100 radio channels.

For the macro-repeater, it uses a much higher gain receive antenna that can be pointed once during installation and does not need to be adjusted again. The isolation between transmit and receive frequencies can be improved by placement of the transmit and receive antennas. A very directional parabolic receive antenna with narrow beamwidth helps to eliminate the ring around problem of terrestrial transmit waveforms entering or corrupting the receive waveforms.

A micro-repeater has none of these advantages. Transmit and receive antennas are co-located in the same device. The orientation of the transmit and receive antennas should be independently adjustable. Assuming the micro-repeater can be positioned to see the southern sky, there may be less correlation to the intended indoor coverage area. Setting the digital satellite radio to receive satellite signals may not be the best setting for covering the indoor area.

The antenna on the micro-repeater is typically set once and forgotten as is the case for the macro-repeater. The isolation between transmit and receive is much less and will complicate the ring around problem. The gain on the transmit and receive antennas are again limited by size, and as such, will not have the narrow beamwidths achieved by the terrestrial macro-repeater.

Moreover, satellite radio providers have interference problems with over-deployment of terrestrial repeaters that operate in such a simulcast environment. The trend is for even more of these micro-repeaters to be scattered. This is going to worsen the interference problems.

SUMMARY OF THE INVENTION

In view of the foregoing background, it is therefore an object of the present invention to provide a digital satellite radio system that overcomes indoor reception problems for digital satellite radio units.

This and other objects, features, and advantages in accordance with the present invention are provided by a digital satellite radio system comprising a content server for providing digital satellite radio channels, at least one satellite for broadcasting the digital satellite radio channels, and at least one terrestrial repeater for broadcasting the digital satellite radio channels.

The digital satellite radio system further comprises at least one micro-repeater for receiving a selected digital satellite radio channel from the content server while not receiving unselected digital satellite radio channels, and for wirelessly broadcasting the selected digital satellite radio channel in a different waveform as used by the terrestrial repeater but using a same physical layer. At least one digital satellite radio unit is for receiving the digital satellite radio channels from the satellite and the terrestrial repeater, and for receiving the selected digital satellite radio channel from the micro-repeater while not receiving the unselected digital satellite radio channels.

The micro-repeater is connected to the Internet for receiving digital satellite radio channels from the content server. To overcome indoor reception problems of the digital satellite radio unit, the micro-repeater advantageously receives a selected digital satellite radio channel as determined by a user of the radio unit over the Internet. Instead of using a large bandwidth and transmitting all 100 digital radio channels over the Internet to each digital satellite radio unit, only the selected channel is transmitted thereto.

The same physical layer as used by the terrestrial repeater may be based upon a coded orthogonal frequency division multiplexing. The LAN may comprise a wireless LAN.

The micro-repeater may also broadcast jamming data to the digital satellite radio unit for preventing reception of the digital satellite radio channels from the satellite while also broadcasting the selected digital satellite radio channel. This avoids service being interrupted by the digital satellite radio unit when having to select from among relatively same strength signals from the satellite and from the micro-repeater. In this embodiment, when the micro-repeater is operating, the digital satellite radio unit ignores the signals from the satellite.

In one approach, the jamming data corrupts a check sum performed by the digital satellite radio unit on the digital satellite radio channels received from the satellite. In another approach, the jamming data corrupts a forward error correction scheme performed by the digital satellite radio unit on the digital satellite radio channels received from the satellite.

The digital satellite radio unit may comprise a receive only digital satellite radio unit. The satellite radio system may further comprises a remote control for communicating with the micro-repeater for selecting the digital satellite radio channel received by the digital satellite radio unit. In another embodiment, the satellite radio system may further comprise a cellular telephone for communicating with the micro-repeater for selecting the digital satellite radio channel received by the digital satellite radio unit. The cellular telephone may even be integrated with the digital satellite radio unit.

Another aspect of the present invention is directed to a method for operating a digital satellite radio system as described above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
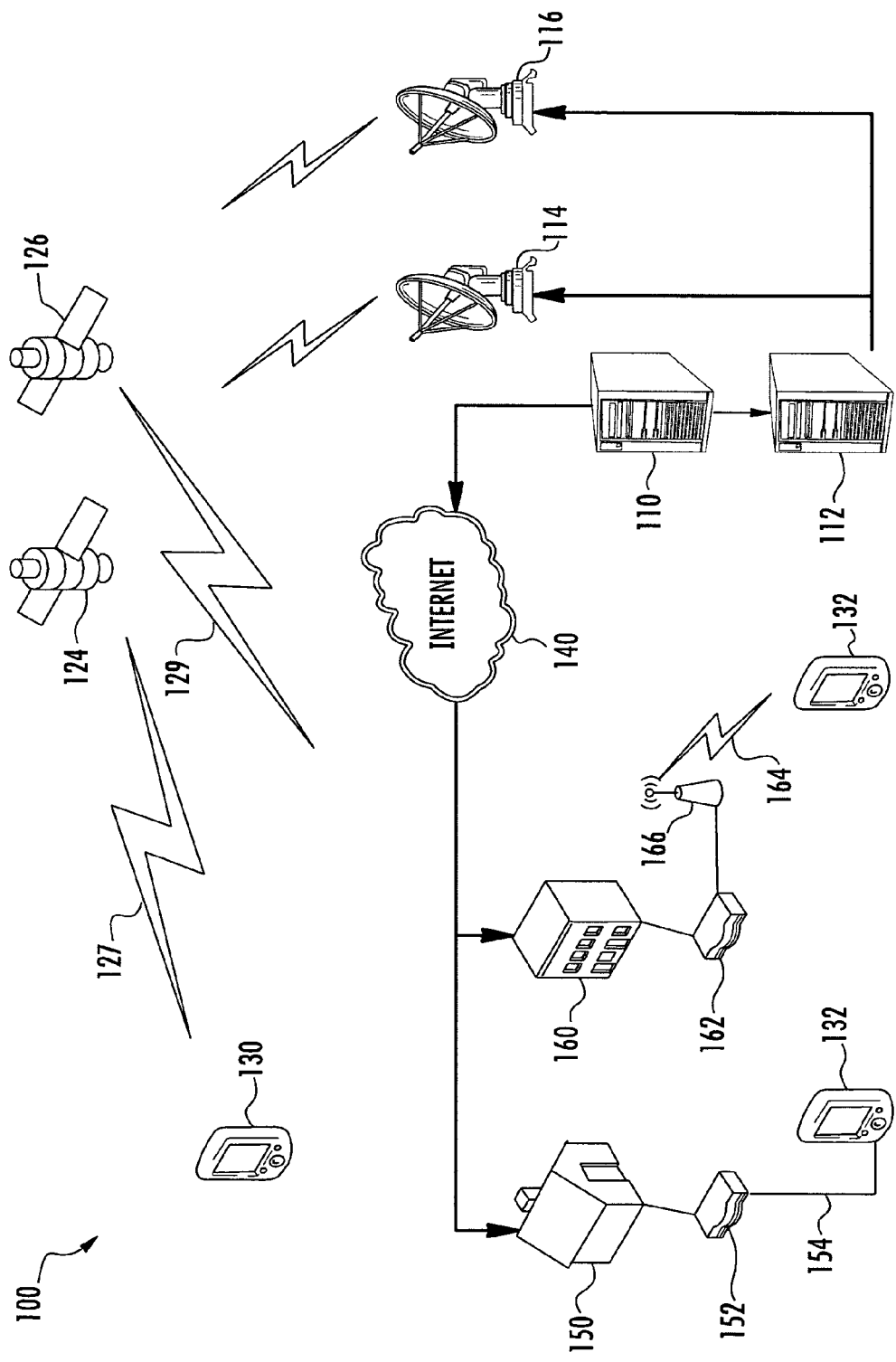
FIG. 1 is a schematic diagram of a digital satellite radio system in which digital satellite radio units are receiving selected digital radio channels from a content server via the Internet in accordance with the present invention.
Figure 2:
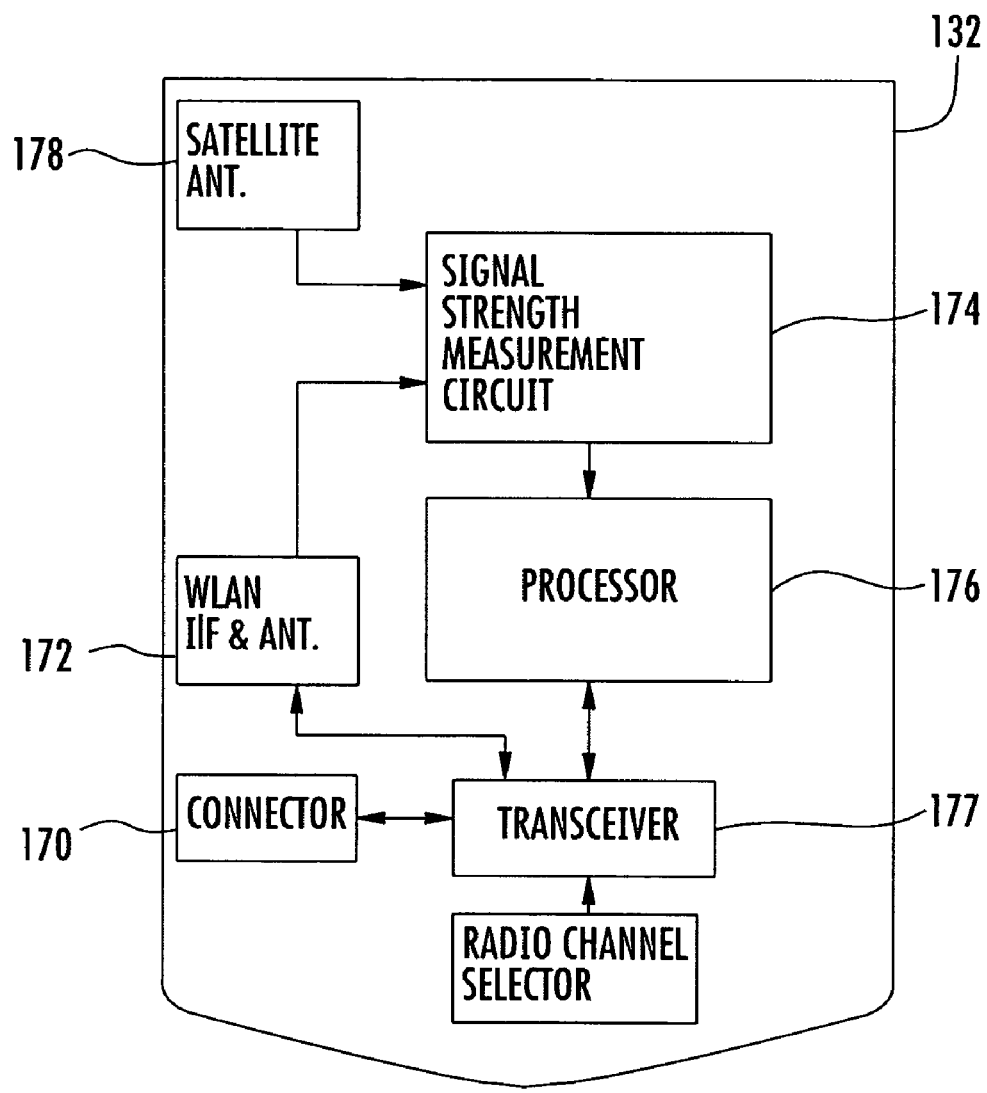
FIG. 2 is a block diagram of the digital satellite radio unit shown in FIG. 1.

Referring initially to the satellite radio system 100 illustrated in FIG. 1, a content server 110 provides digital satellite radio channels to a broadcast satellite transmitter 112, which in turn provides the digital satellite radio channels to a pair of transmit stations 114, 116 for broadcast by a pair of satellites 124, 126. The satellites 124, 126 broadcast the digital satellite radio channels to digital satellite radio units 130, 132 via links 127, 129. The broadcast bandwidth for the digital satellite radio channels from the satellites 124, 126 is high since 100 digital satellite radio channels are transmitted to the digital satellite radio units 130, 132.

When indoor coverage blocks the links 127, 129 from the satellites 124, 126 to the digital satellite radio units 132 located within a house 150 or office building 160, digital satellite radio channels are provided via the Internet 140. The content server 110 provides selected digital satellite radio channels over the Internet 140 for reception by the digital satellite radio units 132 within the illustrated structures 150, 160.

In accordance with the present invention, the illustrated digital satellite radio units 132 have been modified (as compared to units 130) to receive a selected digital satellite radio channel over the Internet 140 while not receiving the unselected digital satellite radio channels. Only 1 out of the 100 available radio channels is received by a respective digital satellite radio unit 132.

The digital satellite radio unit 132 in the house 150 is connected to a modem 152 via a wired connection 154. The modem 152 is either a cable modem or a DSL modem, for example. The wired connection 154 may be a USB cable or an Ethernet cable, as readily appreciated by those skilled in the art.

Although not illustrated, the modem 152 may be connected to a router so that more than one digital satellite radio unit 132 is connected to the modem for receiving a respective selected digital satellite radio channel. The digital satellite radio unit 132 includes a connector 170, such as a USB connector or an Ethernet connector, for the wired connection 154.

The digital satellite radio unit 132 in the office building 160 is connected to a modem 162 via a wireless connection 164. The modem 162 is either a cable modem or a DSL modem, for example. The wireless connection 164 may be local area network (LAN), such as an Ethernet network, as readily appreciated by those skilled in the art. The illustrated LAN includes an access point 166 for interfacing between the modem 162 and the digital satellite radio unit 132. The access point 166 may support more than one digital satellite radio unit 132, where each unit selects a respective digital satellite radio channel. The digital satellite radio unit 132 also includes a wireless connector interface 172 for interfacing with the access point 166.

The respective digital satellite radio channels selected by the digital satellite radio units 132 are sourced by the content server 110 connected to the Internet 140. The satellite radio content arrives in the home 150 or office building 160 and is distributed to the digital satellite radio units 132.

This approach requires a home or office network capable of servicing at least 48 kbps of UDP-like content. Many homes 150 are now equipped with digital broadband service via television cable modems, digital subscriber line (DSL) modems in either an ADSL or VDSL configuration, or point to multi-point wireless broadband (802.16, wireless cable, etc.) modems. All of these can be networked at the home 150 or office building 160 to provide a private IP address. Most networks have been configured with DHCP to automatically assign an IP address to connected devices.

The wired option, consistent with a LAN or USB interface, shows the streaming content entering the home 150 going to the home modem 152 and finally to the digital satellite radio unit 132. A wired connection 154 using an LAN or USB interface is used for the connection between the home modem 152 and the digital satellite radio unit 132. This requires an additional port or connector 170 on the digital satellite radio unit 132. The additional port 170 receives and interfaces with the 10/100 Base-T Ethernet, for example.

The streaming content provided via the Internet 140 will be just the digital data corresponding to the selected digital satellite radio channel of interest. In addition, some framed broadcast information channel (BIC) data containing information on what is being transmitted on the unselected channels is also provided to the digital satellite radio units 132.

When neither satellite nor terrestrial reception is available (or marginal) and the wired connection 154 connects the digital satellite radio unit 132 to the home modem 152, it receives an IP address and communicates via the Internet 140 to the content server 110. In the case of XM Radio, the content server 110 is co-located at their distribution center in Washington D.C. The digital satellite radio unit 132 recognizes when it is plugged in and does things seamlessly for the user. The digital satellite radio unit 132 need only communicate the radio channel number being requested by the user, and some authentication information. A capabilities negotiation may be performed since neither end really knows what sort of quality of service can be maintained over the digital link.

Once these tasks are completed, the content server 110 begins transmitting via UDP protocol (or other non-ACK needing streaming protocol) the digital content for the one digital satellite radio channels of interest as requested by the user based on his tuning choice. In this configuration, there is no need to send all 100 channels worth of content since only one digital satellite radio channel is listened to at a time.

In this embodiment, the selected digital satellite radio channel of interest requires approximately 48 kbps (assuming the satellite link budget coding overhead). If required, less coding on the more reliable Ethernet network would reduce the required bandwidth lower. A voice channel, such as a weather report, still only requires 4-8 kbps, which could even be handled well with dial-up POTS service.

A channel change request, i.e., a new radio channel request, is indicated as a new message from the digital satellite radio unit 132 to the content server 110, and new content would begin as soon as practical. There are many interleaver delays built into the satellite link physical layer. Much of this would not be required for an Ethernet digital data stream, but some would be needed for collision and failed packet delivery.

The Ethernet capability may be built into each digital satellite radio unit 132, but is preferably enabled through satellite commands. Digital satellite radio units 130 are currently provisioned out of the box via satellite commanding and are not modified to interface with the Internet 140. An additional service fee may be required to source this content via the Internet 140.

An alternate wired embodiment might look very similar to the above discussion except it uses a USB interface for the data. USB interfaces are becoming common between a device and a personal computer, but not too common between a device and a modem/router. The USB interface might be useful if it were to be a slave device that piggy-backs upon the Ethernet interface of an existing personal computer. This begins to look a little more like the XM PCR, but a major difference is that the content is coming over the Internet 140 and is not being received from the satellites 124, 126 or a terrestrial repeater.

The wireless option, consistent with a WLAN or Bluetooth interface, shows the digital radio content entering an office building 160 going to an office modem/router 162, to an access point (AP) 166 and then to the digital satellite radio unit 132. The wireless connection 164 using WLAN or Bluetooth is for the connection between the access point 166 and the digital satellite radio unit 132. Other wireless standards besides WLAN and Bluetooth could be used. The access point 166 and the office modem/router 162 could be combined into one device.

This embodiment is also based on an Ethernet interface, except it is preceded with a wireless LAN interface. A signal strength measurement circuit 174, similar to a satellite signal strength meter, is included in the digital satellite radio unit 132. Different color indicators may be used to tell the user whether its wireless data link is good enough to support the highest quality audio or just a low quality voice link. The physical layer options for the wireless data link could be any of IEEE 802.11a, 802.11b, 802.11g, 802.16 or possibly ZigBee or Bluetooth, for example.

The WLAN implementation requires a dual-mode decision making processor or module 176. Depending on subscription rates (charge or free of charge), a digital satellite radio unit 132 might defer to the Ethernet service when in range of a WLAN access point 166. The digital satellite radio unit 132 might attempt to provide the best overall quality of service when both reception paths exist. In one embodiment, the satellite antenna 178 provides signals to the signal strength measurement circuit 174 for comparison with the signals received by the WLAN interface 172. If satellite or terrestrial service is deemed marginal within the interior of the office building 160, and WLAN coverage is detected, the dual-mode decision making processor 176 chooses the Ethernet path over the satellite mode. When satellite service improves, service is returned back to satellite reception.

The switching decision may also be a function of battery consumption (WLAN versus satellite or terrestrial repeater). The goal is to minimize the interruption of service to the digital satellite radio unit 132 and maximize the quality of service. For wired 10/100 Base T or wireless connections, the digital satellite radio units 132 may select satellite reception if available due to a lower delivery cost.

Figure 3:
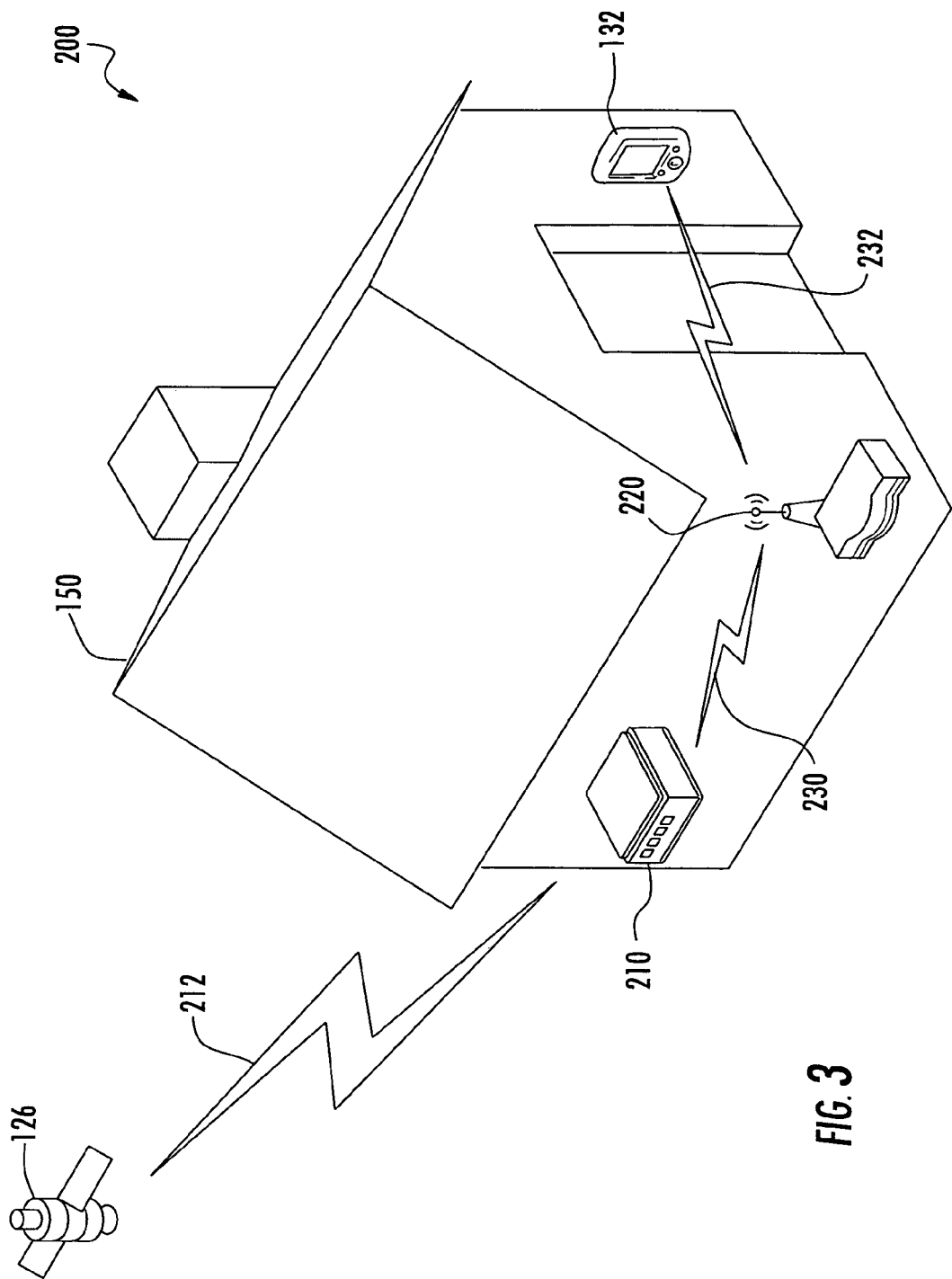
FIG. 3 is a schematic diagram of a digital satellite radio system in which a micro-repeater receives digital satellite radio channels from a satellite for relaying a selected digital radio channel to a digital satellite radio unit via an access point in accordance with the present invention.

Referring now to FIG. 3, a digital satellite radio system 200 in which a micro-repeater 210 receives the digital satellite radio channels via link 212 from the satellite 126 for relaying a selected digital radio channel to a digital satellite radio unit 132 via an access point 220 is provided. The micro-repeater 210 is added as a middleman to convert from the satellite or terrestrial digital radio waveforms to the WLAN content stream as discussed above.

The satellite radio micro-repeater 210 is modified to include WLAN capabilities to communicate with the WLAN enabled digital satellite radio unit 132. The digital satellite radio unit 132 requests via the access point 220 that only the digital representation of the digital satellite radio channel of interest is transmitted via a UDP like protocol over the WLAN links 230, 232.

Figure 4:
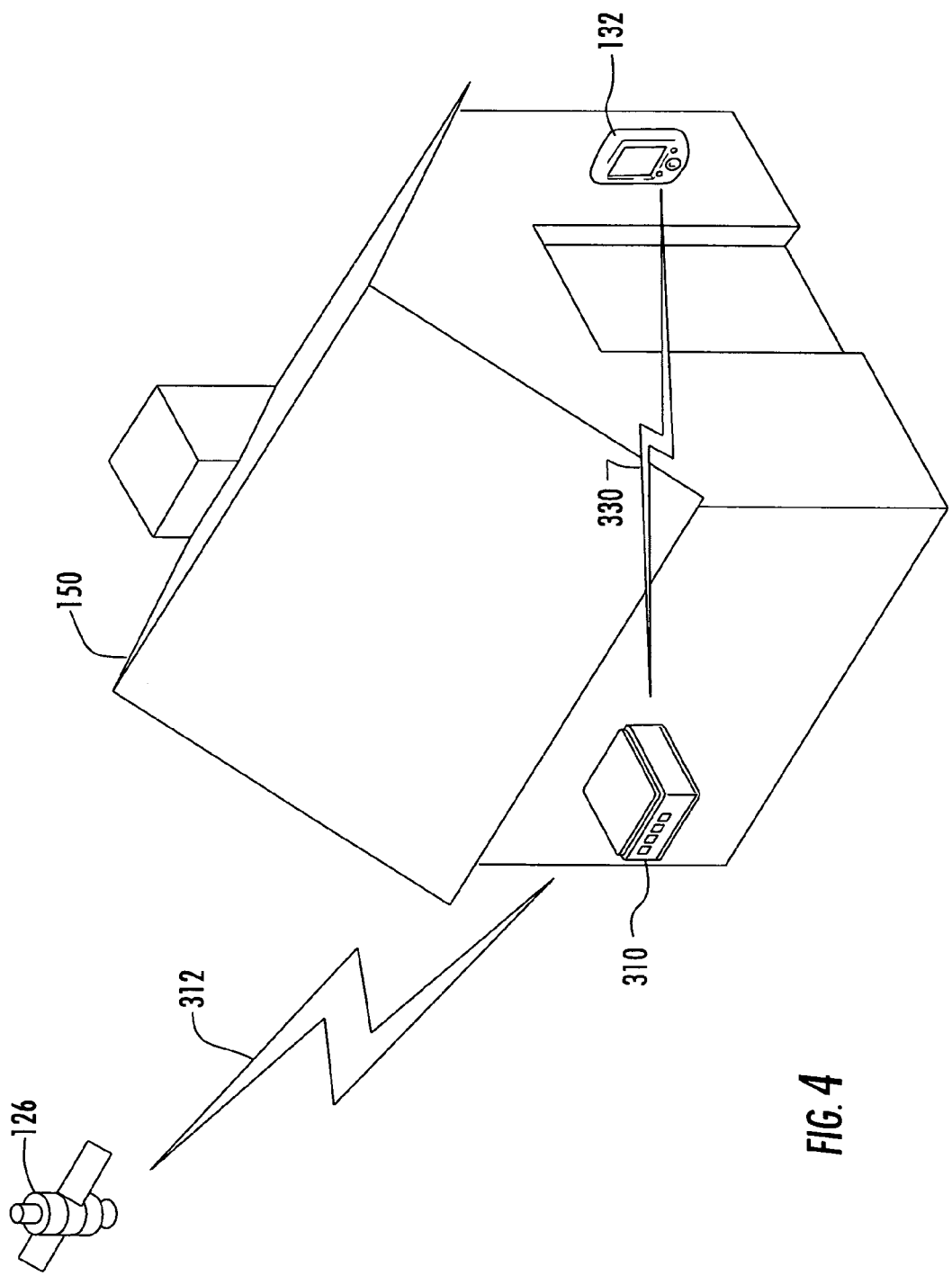
FIG. 4 is a schematic diagram of the digital satellite radio system shown in FIG. 3 with the access point included with the micro-repeater.

In other embodiments, the access point is included with the satellite radio micro-repeater 310, as illustrated in FIG. 4. The micro-repeater 310 operates in an ad-hoc mode point-to-point with the digital satellite radio unit 132 via link 330. The micro-repeater 310 receives the radio channels via link 312 from the satellite 126.

Although not illustrated, more than one digital satellite radio unit 132 can communicate with the micro-repeater 310 to receive their selected digital satellite radio channel, as readily appreciated by those skilled in the art. The number of radio units 132 is limited by the WLAN bandwidth available and the quality of service constraints. WLAN network loading coupled with the bandwidth demands of the requested channel set would limit additional subscribers from authenticating with the micro-repeater 310 for their indoor coverage.

Referring back to FIG. 3, WLAN client card technology is included into a satellite micro-repeater 210. The micro-repeater 210 is positioned in the southern looking window to receive the regular satellite signals via link 212. The micro-repeater 210 authenticates and associates with the WLAN access point 220 already installed in the house 150 or office building 160. The access point 220 acts as a wireless middleman to the digital satellite radio unit 132 that also has WLAN capabilities.

The streaming content is limited to the digital data corresponding to the digital satellite radio channel of interest, and in addition, some framed broadcast information channel (BIC) data containing indications of what is being transmitted on the unselected radio channels. This approach requires a WLAN connection capable of servicing at least 48 kbps of UDP-like content. The digital satellite radio unit 132 automatically recognizes when it is in WLAN range and does things seamlessly for the user.

Once these tasks are completed, the micro-repeater 210 begins transmitting via UDP protocol (or other non-ACK needing streaming protocol) the digital content for the one radio channel of interest as requested by the user based on his tuning choice. As in the above embodiments, there is no need to send all 100 channels worth of content since the end user only listens to one radio channel at a time. The benefit of this scheme is that one channel only requires approximately 48 kbps. The digital satellite radio unit 132 operates as discussed above.

The digital satellite radio unit 132 includes a transceiver 177 for transmit and receive functions. However, the majority of the data flow is from the micro-repeater 210 towards the radio unit 132. Therefore, the digital satellite radio unit 132 is in the receive mode for a very large percentage of the time, such as more than 90% of the time, for example.

There are a few messages required to be sent from the digital satellite radio unit 132 to the micro-repeater 210. One would be an indication of a new radio channel request selected by the user via the radio channel selector 179. Upon power up or entry into WLAN coverage, the digital satellite radio unit 132 broadcasts a query looking for responding access points 220, or is directed to a specific IP address as configured. Some authentication information is also sent to prevent a rouge device from getting the streaming content for free.

There are various schemes for the digital satellite radio unit 132 to learn about coverage and capabilities. Either a pre-arranged default configuration or configurable settings done when the digital satellite radio unit 132 is provisioned could be utilized. Capability negotiations, bandwidth demands and loading information need to be communicated. A capabilities negotiation is useful since neither end really knows what sort of quality of service can be maintained over the digital link.

In each of the embodiments illustrated in FIGS. 3 and 4, an IP assignment could be managed by a DHCP server in the micro-repeater 210, 310 or THE WLAN access point 220 or by direct configuration in the digital satellite radio unit 132. A private IP address or pre-arranged private IP address would be most beneficial for managing services and detection algorithms performed by the digital satellite radio unit 132.

It is expected that the current micro-repeater implementation in FIGS. 3 and 4 will be similar to the larger terrestrial repeaters. They will listen to the satellite 126 and then transmit via WLAN or other wireless standards to the digital satellite radio units 132. The problem with terrestrial repeaters (terrestrial and micro) is that they relay the entire radio channel lineup. The embodiments in accordance with the present invention preferably only relay the radio channel of interest over the area that is not getting adequate indoor satellite radio coverage.

None of the above embodiments rely on the RF delivery of content via satellite or terrestrial repeaters to the digital satellite radio unit 132. An existing high bandwidth connection is used and the requested digital content as requested by the user is delivered as opposed to the entire bandwidth stream (Channels 1-50 or Channels 51-100).

Figure 5:
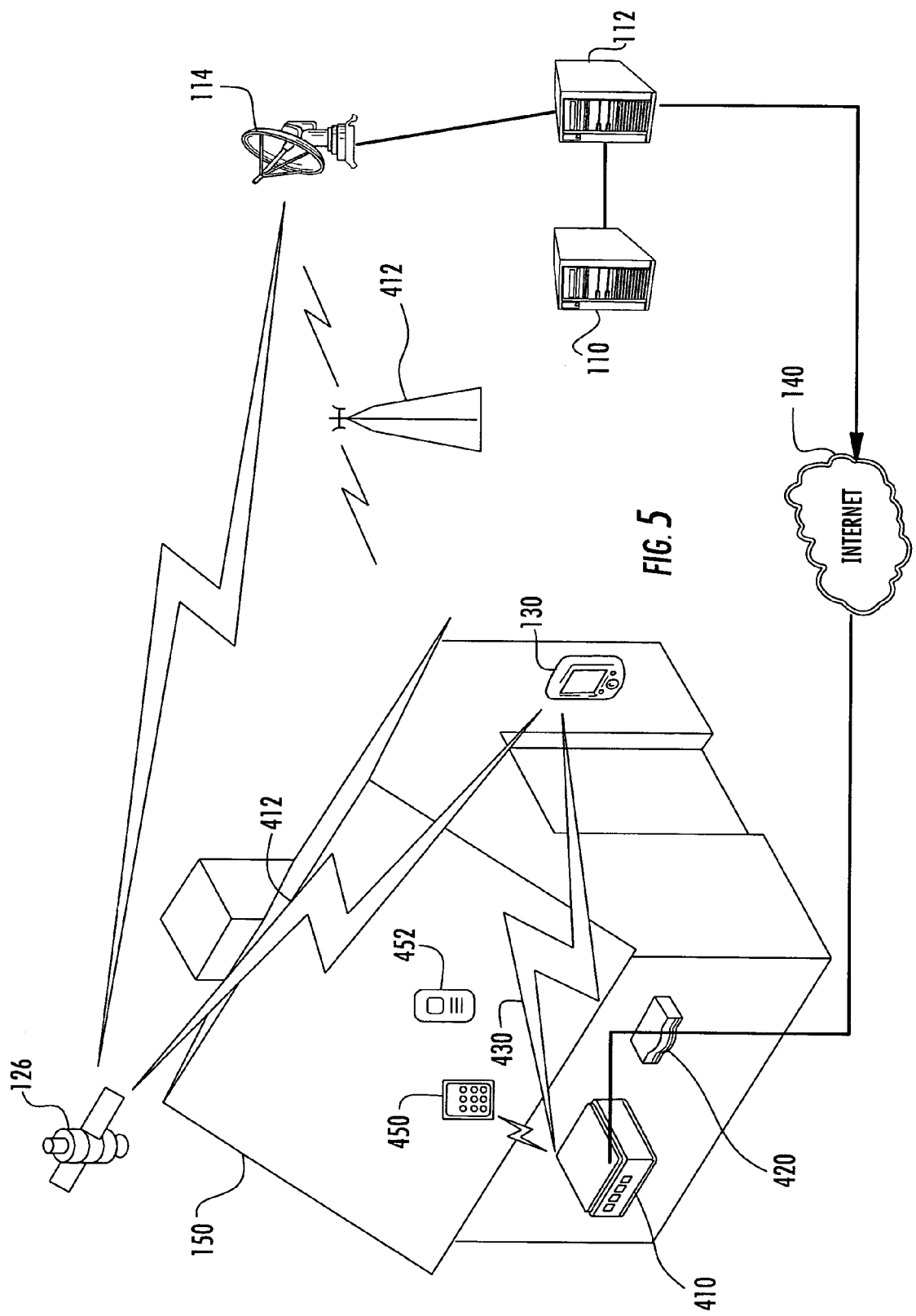
FIG. 5 is a schematic diagram of a digital satellite radio system in which a micro-repeater receives digital satellite radio channels from a content server via the Internet for relaying a selected digital radio channel to a digital satellite radio unit in accordance with the present invention.

Previous approaches to indoor reception problems focused on directing the satellite (or terrestrial) signal into the building 160 using a repeater or sub-repeater. The goal with these previous approaches was to keep the digital satellite radio unit 130 the same as was designed for line of sight operation with the satellite outdoors or shadowed coverage through terrestrial repeaters. If that goal is maintained then a combination of the above embodiments can be utilized. Changes to the micro-repeaters 210, 310 would be to include Ethernet and/or wireless land based data broadband capabilities Referring now to FIG. 5, a micro-repeater 410 receives the digital content via a land based wired or wireless broadband data service 140, and regenerates the terrestrial waveform similar to the macro-repeaters installed in large urban areas.

The micro-repeater 410 can be located anywhere within the indoor coverage area of the house 150 that is convenient for subscriber use indoor coverage. There is no need to compromise between satellite reception and indoor transmit coverage. The Internet source 140 can be any of the typical payload delivery methods such as cable modem, DSL, fiber or point to multi-point wireless broadband service, such as 802.16.

Once inside the structure 150, the data stream may be delivered to the micro-repeater 410 through typical means such as a direct Ethernet connection, connection after a home hub or router 420, or via a wireless Ethernet bridge IEEE 802.11 (any variety). A version of this Internet sourced micro-repeater 410 may also have the WLAN subscriber electronics integrated within. In summary, the micro-repeater 410 gets the information stream for broadcasting from the Internet 140 and not from the satellites 126.

The waveform broadcast by the micro-repeater 410 is not the same as a terrestrial macro-repeater 412. It would still be the same physical layer COFDM (coded orthogonal frequency division multiplexing). The reason it cannot be the same is because that would require that all 100 channels, or even one ensemble (50 channels) would need to be delivered via the Internet 140 and the content server 110 to each of these micro-repeaters 410. This is not practical since most decent home data connections only support about 1 Mbps (cable and DSL).

Instead, only the radio channel of interest is delivered by the Internet 140 to the micro-repeater 410. It is the micro-repeaters 410 job to format that single stream of content to appear like a fully loaded COFDM waveform 430. This may mean the COFDM replicates the radio channel of interest to appear on all channels of the ensemble such that regardless of the radio channel selected by the digital satellite radio unit 130, they receive the same content.

This is somewhat analogous to a TV and VCR relationship when the viewer wants to use the VCR tuner to change channels. The TV is tuned to channel 3, the TV/VCR button is toggled, and the content being sourced is now from the VCR instead of the cable or antenna input. The digital satellite radio unit 130 may be configured to tune to the lowest channel of either one of the two ensembles, or selects the channel (low, mid or high) that supports the best indoor coverage, if such an advantage exists.

Since the digital satellite radio unit 130 receiver is designed to demodulate both satellite signals 412 and a terrestrial repeater signal 430, in one embodiment, some sort of low power tricked data is broadcast on the two satellite RF channels of the ensemble of interest.

Since we are in this special mode where the channel choice is actually controlled by the micro-repeater 410, the coherent combining that is usually counted on is no longer valid. Therefore, the satellite waveforms 412 need to be jammed, just in case they penetrate the indoor coverage area that is supposed to be poor. One option includes sending null data that decodes to silence. This depends on where the coherent combining is done in the radio unit 130, as readily understood by those skilled in the art.

Another option is to intentionally corrupt check sums or FEC to force the radio unit 130 into deciding the SNR is not good enough to include in combining efforts. Some spoofing of the satellite signal 412 needs to be performed to make sure that the digital satellite radio unit 130 does not attempt to rely on the satellite 126 while the micro-repeater 410 is on.

Assuming the digital satellite radio unit 130 has no mechanism to communicate to a micro-repeater 410, the ability to change stations would be limited to the micro-repeater. In other embodiments, such as the modified digital satellite radio unit 132, a request for a selected radio channel can be initiated therefrom.

Alternatively, there are some options to get the radio channel changed from a distance. One approach is through a separate remote control 450 similar to a TV. This could be an infrared or RF type remote control. RF remote controls have greater range and do not require a line of sight. Since the micro-repeater 410 is a network device, a user near a computer could have a software application or simple command sequence to change channels. This is somewhat of similar to the XM PCR described earlier but it can only change the channels of the digital satellite radio unit 130 device directly connected to the PC doing the commanding.

In this case, any device on the home network could command the micro-repeater 410 to change channels. This might also include a WLAN subscriber like device. As with infrared or RF remotes, this would be a WLAN remote. Other protocols like Bluetooth and ZigBee are specifically designed for this low power, low data rate commanding. The commands just need to get to the network.

As XM Radio functions are integrated with cell phones, a user with a cell phone 452 that includes the digital satellite radio unit 130 integrated therein can make a call to an 800 number and key in a new channel. This call integrates with the XM content server 110 and changes the flow to the micro-repeater 410 as well as telling it that a user has requested a radio channel change. This could also be a more straightforward SMS text message.

One advantage is that the terrestrial macro-repeaters 412 all broadcast the exact same content, just time delayed from one another. The digital satellite radio units 130 may exploit this in their demodulator implementations. In some scenarios, the difference in delay might act in a destructive manner and hurt each other.

In this implementation, the content streams of different micro-repeaters 410 would not be similar, so a radio resource management function is integrated into the micro-repeater. Current demodulators in the digital satellite radio unit 130 cannot exploit the similarity of received waveforms. Many of the concepts being developed that allow IEEE 802.11 access points to cooperate could be incorporated in these micro-repeaters 410 instead. If two neighbors install micro-repeaters 410 in neighboring apartment units, they could automatically learn of each others existence and attempt to cooperate their coverage areas. Smart antennas are a useful tool to address this problem.

The existing embodiment could incorporate a receive function for listening for other micro-repeater transmissions. Coordination of a transmission ID of the micro-repeater programmed or configured in the digital satellite radio unit 130 would allow the unit, who also programs or configures the same, to discriminate one micro-repeater from another. This is similar to a network scan done by IEEE 802.11 client cards when first powered on in a new environment.

Since the terrestrial macro-repeaters 412 transmit in different frequencies for ensemble A and ensemble B, this is one way separation between next door neighbors could be determined. If your neighbor selected the ensemble A frequency, the user sets his to the ensemble B frequency and there is no longer a conflict. This would still require the digital satellite radio unit 130 to tune to the pre-arranged channel number compatible with the ensemble of choice.

More than one digital satellite radio unit 130 can be serviced by the same micro-repeater 410. The Internet 140 could source two streams of 48 kbps data to the micro-repeater 410 and the COFDM waveform would encode both streams just like it did one in the past. The Jazz would be broadcast, for example, on channel one while the Country Western would be broadcast on channel two. Channel change (both manual and remotely) could be performed independent for each stream of music content. The commanding would be adaptable to know that one or two streams are enabled and that the additional knowledge of whose channel needs to change would be included.

Although the features and elements of the present invention are described in the preferred embodiments in particular combinations, each feature or element can be used alone without the other features and elements of the preferred embodiments or in various combinations with or without other features and elements of the present invention. Many modifications and other embodiments of the invention will come to the mind of one skilled in the art having the benefit of the teachings presented in the foregoing descriptions and the associated drawings.

In addition, other features relating to satellite radio are disclosed in the copending patent application filed concurrently herewith and assigned to the assignee of the present invention and is entitled DIGITAL SATELLITE RADIO SYSTEMS AND ASSOCIATED METHODS FOR PROVIDING INDOOR RECEPTION, (ITC-2-1065.01.US), the entire disclosure of which is incorporated herein in its entirety by reference. Therefore, it is understood that the invention is not to be limited to the specific embodiments disclosed, and that modifications and embodiments are intended to be included within the scope of the appended claims.

That which is claimed is:

1. A digital satellite radio system comprising:
a content server for providing a plurality of digital satellite radio channels;
at least one satellite for broadcasting the plurality of digital satellite radio channels;
at least one terrestrial repeater for broadcasting the plurality of digital satellite radio channels;
at least one microrepeater for receiving a selected digital satellite radio channel from said content server while not receiving unselected digital satellite radio channels, and wirelessly broadcasting the selected digital satellite radio channel in a different waveform as used by said at least one terrestrial repeater but using a same physical layer, the selected digital satellite radio channel having either a first frequency corresponding to a first ensemble of channels or a second frequency corresponding to a second ensemble of channels;
at least one digital satellite radio unit for receiving the plurality of digital satellite radio channels from said at least one satellite and said at least one terrestrial repeater, and for receiving the selected digital satellite radio channel from said at least one microrepeater while not receiving the unselected digital satellite radio channels; and
wherein if said at least one micro-repeater detects an adjacent micro-repeater transmitting on the first or second frequency, then said at least one micro-repeater changes the frequency of the selected digital satellite radio channel for said at least one digital satellite radio unit so that it is different from the frequency used by the adjacent micro-repeater.

2. A satellite radio system according to claim 1 wherein the same physical layer as used by said at least one terrestrial repeater is based upon coded orthogonal frequency division multiplexing.

3. A satellite radio system according to claim 1 wherein said at least one micro-repeater is connected to the Internet for receiving digital satellite radio channels from said content server.

4. A satellite radio system according to claim 3 wherein said at least one microrepeater is connected to the Internet via a local area network (LAN)

5. A satellite radio system according to claim 4 wherein said LAN comprises a wireless LAN.

6. A satellite radio system according to claim 1 wherein said at least one micro-repeater broadcasts jamming data to said at least one digital satellite radio unit for preventing reception of the plurality of digital satellite radio channels from said at least one satellite while also broadcasting the selected digital satellite radio channel.

7. A satellite radio system according to claim 6 wherein the jamming data corrupts a check sum performed by said at least one digital satellite radio unit on the plurality of digital satellite radio channels received from said at least one satellite.

8. A satellite radio system according to claim 6 wherein the jamming data corrupts a forward error correction scheme performed by said at least one digital satellite radio unit on the plurality of digital satellite radio channels received from said at least one satellite.

9. A satellite radio system according to claim 1 wherein said at least one digital satellite radio unit comprises a receive only digital satellite radio unit.

10. A satellite radio system according to claim 1 further comprising a remote control for communicating with said at least one micro-repeater for selecting the digital satellite radio channel received by said at least one digital satellite radio unit.

11. A satellite radio system according to claim 1 further comprising a cellular telephone for communicating with said at least one micro-repeater for selecting the digital satellite radio channel received by said at least one digital satellite radio unit.

12. A satellite radio system according to claim 11 wherein said cellular telephone is integrated with said at least one digital satellite radio unit.

13. A method for operating a digital satellite radio system comprising:
providing a plurality of digital satellite radio channels by a content server;
broadcasting the plurality of digital satellite radio channels by at least one satellite;
broadcasting the plurality of digital satellite radio channels by at least one terrestrial repeater;
providing a selected digital satellite radio channel to at least one micro-repeater from the content server while not receiving unselected digital satellite radio channels, and wirelessly broadcasting the selected digital satellite radio channel in a different waveform as used by the at least one terrestrial repeater but using a same physical layer, the selected digital satellite radio channel having either a first frequency corresponding to a first ensemble of channels or a second frequency corresponding to a second ensemble of channels;
receiving the selected digital satellite radio channel by the at least one digital satellite radio unit from the at least one microrepeater while not receiving the unselected digital satellite radio channels; and
wherein if the at least one micro-repeater detects an adjacent micro-repeater transmitting on the first or second frequency, then the at least one micro-repeater changes the frequency of the selected digital satellite radio channel for the at least one digital satellite radio unit so that it is different from the frequency used by the adjacent micro-repeater.

14. A method according to claim 13 wherein the same physical layer as used by the at least one terrestrial repeater is based upon coded orthogonal frequency division multiplexing.

15. A method according to claim 13 wherein the at least one micro-repeater is connected to the Internet for receiving digital satellite radio channels from the content server.

16. A method according to claim 15 wherein the at least one micro-repeater is connected to the Internet via a local area network (LAN).

17. A method according to claim 16 wherein the LAN comprises a wireless LAN.

18. A method according to claim 13 wherein the at least one micro-repeater broadcasts jamming data to the at least one digital satellite radio unit for preventing reception of the plurality of digital satellite radio channels from the at least one satellite while also broadcasting the selected digital satellite radio channel.

19. A method according to claim 18 wherein the jamming data corrupts a check sum performed by the at least one digital satellite radio unit on the plurality of digital satellite radio channels received from the at least one satellite.

20. A method according to claim 18 wherein the jamming data corrupts a forward error correction scheme performed by the at least one digital satellite radio unit on the plurality of digital satellite radio channels received from the at least one satellite.

21. A method according to claim 13 wherein the at least one digital satellite radio unit comprises a receive only digital satellite radio unit.

22. A method according to claim 13 wherein the digital satellite radio system further comprises a remote control communicating with the at least one micro-repeater for selecting the digital satellite radio channel received by the at least one digital satellite radio unit.

23. A method according to claim 13 wherein the digital satellite radio system further comprises a cellular telephone for communicating with the at least one micro-repeater for selecting the digital satellite radio channel received by the at least one digital satellite radio unit.

24. A method according to claim 23 wherein the cellular telephone is integrated with the at least one digital satellite radio unit.

* * * * *

UNITED STATES PATENT AND TRADEMARK OFFICE
CERTIFICATE OF CORRECTION

PATENT NO. : 7,620,365 B2  Page 1 of 1
APPLICATION NO. : 11/215148
DATED : November 17, 2009
INVENTOR(S) : Hoffmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 763 days.

Signed and Sealed this

Twenty-sixth Day of October, 2010

David J. Kappos
*Director of the United States Patent and Trademark Office*